United States Patent
Halsius et al.

(10) Patent No.: US 12,296,888 B2
(45) Date of Patent: May 13, 2025

(54) COOLING MODULE SUPPORT BRACKET

(71) Applicant: Volvo Car Corporation, Gothenburg (SE)

(72) Inventors: Thomas Halsius, Trollhättan (SE); Ella Viberg, Gothenburg (SE); Kaveh Behbahani, Lindome (SE); José Bechara, Gothenburg (SE); Bo Hansson, Gothenburg (SE); Sylvain Sauvage, Torslanda (SE)

(73) Assignee: Volvo Car Corporation, Gothenburg (SE)

( * ) Notice: Subject to any disclaimer, the term of this patent is extended or adjusted under 35 U.S.C. 154(b) by 328 days.

(21) Appl. No.: 17/941,098

(22) Filed: Sep. 9, 2022

(65) Prior Publication Data

US 2023/0101269 A1    Mar. 30, 2023

(51) Int. Cl.
| | |
|---|---|
| *B62D 21/15* | (2006.01) |
| *B60K 11/04* | (2006.01) |
| *B60R 19/34* | (2006.01) |
| *B60R 19/48* | (2006.01) |
| *B62D 25/08* | (2006.01) |

(52) U.S. Cl.
CPC ............ *B62D 21/152* (2013.01); *B60K 11/04* (2013.01); *B60R 19/34* (2013.01); *B60R 19/48* (2013.01); *B62D 25/084* (2013.01)

(58) Field of Classification Search
CPC .... B62D 21/152; B62D 25/084; B60K 11/04; B60R 19/34; B60R 19/48; B60Y 2306/01
See application file for complete search history.

(56) References Cited

U.S. PATENT DOCUMENTS

| | | | | |
|---|---|---|---|---|
| 1,189,562 | A | * 7/1916 | Groehn et al. ......... | B60K 11/04 248/300 |
| 2004/0124028 | A1* | 7/2004 | Lachapelle ............ | B60K 11/04 180/291 |
| 2010/0314426 | A1* | 12/2010 | Yokoi ..................... | B60R 19/34 224/555 |

FOREIGN PATENT DOCUMENTS

| | | | | |
|---|---|---|---|---|
| CN | 105073562 | A * | 11/2015 | ............ B60K 11/04 |
| CN | 108657280 | A * | 10/2018 | ............ B62D 21/11 |
| EP | 1323566 | A1 * | 7/2003 | ............ B60K 11/04 |
| EP | 2263902 | A2 | 12/2010 | |
| EP | 2098400 | B1 * | 9/2012 | ............ B60K 11/04 |
| EP | 3225512 | A2 * | 10/2017 | ............ B60K 11/04 |
| JP | 2004322837 | A * | 11/2004 | |
| JP | 2005335668 | A * | 12/2005 | |

OTHER PUBLICATIONS

EP-1323566-A1 English Translation (Year: 2003).*

(Continued)

*Primary Examiner* — James A Shriver, II
*Assistant Examiner* — Michael T. Walsh
(74) *Attorney, Agent, or Firm* — Clements Bernard Walker; Christopher L. Bernard

(57) ABSTRACT

A bracket for a cooling module in a front end structure of a vehicle includes forward crash-box connection means, cooling module connection means, a rigid arm extending between the forward crash-box connection means at a forward side and the cooling module connection means at a rearward side; rear crash-box connection means; and a break-away arm extending from the rearward side of the rigid arm and the rear crash-box connection means.

18 Claims, 4 Drawing Sheets

(56) References Cited

OTHER PUBLICATIONS

EP-3225512-A2 English Translation (Year: 2017).*
JP-2005335668-A English Translation (Year: 2005).*
CN-108657280-A English Translation (Year: 2018).*
EP-2098400-B1 English Translation (Year: 2012).*
CN-105073562-A English Translation (Year: 2015).*
JP-2004322837-A English Translation (Year: 2004).*
Mar. 15, 2022 European Search Report issued in corresponding International Application No. 21199852.

* cited by examiner

COOLING MODULE SUPPORT BRACKET

CROSS-REFERENCE TO RELATED APPLICATION

The present disclosure claims the benefit of priority of co-pending European Patent Application No. 21199852.1, filed on Sep. 29, 2021, and entitled "COOLING MODULE SUPPORT BRACKET," the contents of which are incorporated in full by reference herein.

TECHNICAL FIELD

The present disclosure is related to support parts for a heat exchanger, particularly for securing a cooling module in the front end structure of a vehicle.

BACKGROUND

The front end structure of a vehicle typically includes a cooling module with a radiator, positioned behind the front end of the vehicle. The front end usually has a bumper positioned at the very front, with crash-boxes just behind the bumper on each of the sides of the vehicle.

In a frontal impact crash, the front end of the vehicle can be damaged, pushing the bumper and other front parts into the parts behind. This can result in damage to the cooling module and fan, even in very low speed crashes. Such damage to the cooling module can require costly repairs and a tow, since a vehicle with a damaged cooling module and fan can no longer be driven.

SUMMARY

According to a first aspect, a bracket for a cooling module in a front end structure of a vehicle includes forward crash-box connection means; cooling module connection means; a rigid arm extending between the forward crash-box connection means at a forward side and the cooling module connection means at a rearward side; rear crash-box connection means; and a break-away arm extending from the rearward side of the rigid arm and the rear crash-box connection means. Such a bracket can help to minimize or prevent damage to a cooling module in an engine in the event of a front end collision. The bracket allows for the cooling module to move rearward in the event of such a collision with the break-away arm breaking away and moving the cooling module with any movement of the front end of the vehicle. This allows for less-expensive repairs, and often the ability to still drive the vehicle after such a collision.

According to an embodiment, the forward crash-box connection means and/or the rear crash-box connection means includes a plurality of connectors. Optionally, these can be bores, bolts, screws and/or other types of fasteners to securely connect the parts. Further optionally, these can be two vertically spaced crash-box connection means for each of the forward crash-box connection means and the rear crash-box connection means. Such connection means can provide a strong and stable connection, even when experiences large forces such as in a collision.

According to an embodiment, the cooling module connection means includes a screw connection to a cooler side bushing. Such a connection means can provide a secure and simple means of connecting the bracket to the cooling module (or an in-between part).

According to an embodiment, the break-away arm extends substantially vertically from the cooling module connection means. This configuration can provide a bracket that is both simple to manufacture and connect while strong enough to withstand normal operational forces but break upon a frontal collision.

According to an embodiment, the angle between the break-away arm and the rigid arm is less than 90 degrees. This configuration can help to ensure proper strength levels for the bracket, as well and ensure the bracket remains sufficiently compact to take up less space in the vehicle and be usable with a variety of different vehicles.

According to an embodiment, the rigid arm includes an arm which expands in height from the rearward side to the forward side. This could also be seen an a taper from the forward side. In some embodiments, there could be more than one taper angle, a first at the forward side, and a second taper angle at the rearward side. This configuration helps the rigid arm have sufficient strength and rigidity to ensure that the cooling module is moved rearward with any movement of the frontal end of the vehicle.

According to an embodiment, the rigid arm includes cut-out sections and/or sections of reduced material. Such a configuration saves on weight of the bracket and materials costs when manufacturing while still maintaining the necessary strength and rigidity.

According to an embodiment, the bracket further includes a protrusion on one side of the bracket. The protrusion can be formed and located such that the bracket would only connect on a proper side of the cooling module, reducing the risk that the bracket could be connected on the wrong side and possibly not function as intended.

According to an embodiment, the bracket is formed of metal. Optionally, this can be aluminium (including alloys) or another type of metal or other material with sufficient strength and rigidity. Further optionally, the bracket could be formed by die casting.

According to a further aspect of the disclosure, a cooling module includes with a first bracket according connected to a first cooling module bushing on a first side of the cooling module, and a second bracket connected to a second cooling module bushing on a second side of the cooling module; wherein for each of the first and second brackets, the cooling module connection means connects to the cooling module bushing with a screw or bolt connection.

According to an aspect of the disclosure, a frontal vehicle structure includes a cooling module and first and second brackets, and further includes a first crash-box on the first side and a second crash-box on the second side. For each of the first and second brackets, the forward crash-box connection means and the rearward crash-box connection means connects to forward and rearward positions of the crash-box, respectively.

Such a cooling module (and frontal vehicle structure) with first and second brackets connected on either side provides a simple, yet strong and durable side connection for the cooling module in normal vehicle operation, and allows for rearward movement of the cooling module in a low-speed frontal impact crash to reduce or eliminate damage to the cooling module in such a collision.

According to an embodiment, each of the first and second brackets are dimensioned such that the break-away arms break in one or more pieces at a frontal impact crash, and the rigid arms maintain their rigidity to move the cooling module rearward upon rearward movement of the crash-box and forward crash-box connection means. This can be provided by the materials and/or configuration of each of the rigid arms and break-away arms. This can ensure that the vehicle performs as intended, such that the break-away arms break upon a frontal impact collision, and the cooling module is able to be moved rearward to reduce or prevent damage to the cooling module, thereby minimizing overall damage and repair costs.

According to a further aspect, a method of protecting a cooling module in a frontal impact crash using first and second side brackets is provided. Each bracket includes forward crash-box connection means, cooling module connection means; a rigid arm extending between the cooling module connection means at a rearward side and forward crash-box connection means at a forward side, rear crash-box connection means, and a break-away arm extending from the rearward side of the rigid arm to the rear crash-box connection means. The method includes a) connecting the cooling module connection means of the first bracket to a first side bushing of the cooling module; b) connecting the forward crash-box connection means of the first bracket to a first side crash-box; c) connecting the rear crash-box connection means of the first bracket to the first side crash-box at a rearward position from the forward crash-box connection means; d) connecting the cooling module connection means of the second bracket to a second side bushing of the cooling module; e) connecting the forward crash-box connection means of the second bracket to a second side crash-box; and f) connecting the rear crash-box connection means of the second bracket to the second side crash-box at a rearward position from the forward crash-box connection means. Optionally, the connections are with one or more bolts and/or screws.

Such a method provides an efficient and secure way of connecting a cooling module to a frontal structure of a vehicle in such a way that the cooling module can move rearward with the frontal end structure in the event of a frontal impact collision. This can reduce and/or prevent damage to the cooling module, and reduce the costs of repair overall.

The bracket is a very versatile bracket, able to be used with a number of different vehicles due to its size and configuration. In some embodiments, the size would vary, but the general configuration is the same as that described and shown in the drawings. This can lead to less costly production (e.g., common tooling), less complex storage, logistics and assembly, as well as an overall less costly product.

DETAILED DESCRIPTION

Figure 1A:
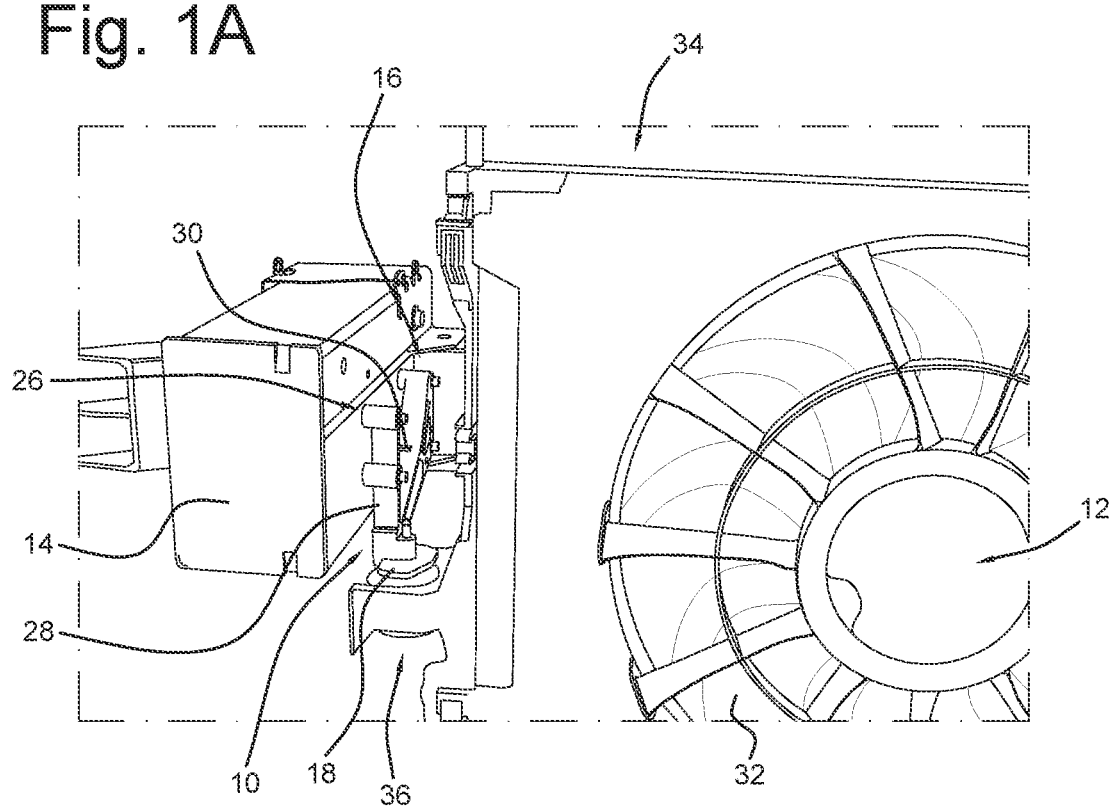
FIG. 1A is a perspective view of a cooling module bracket connecting a cooling module to a side crash-box.
Figure 1B:
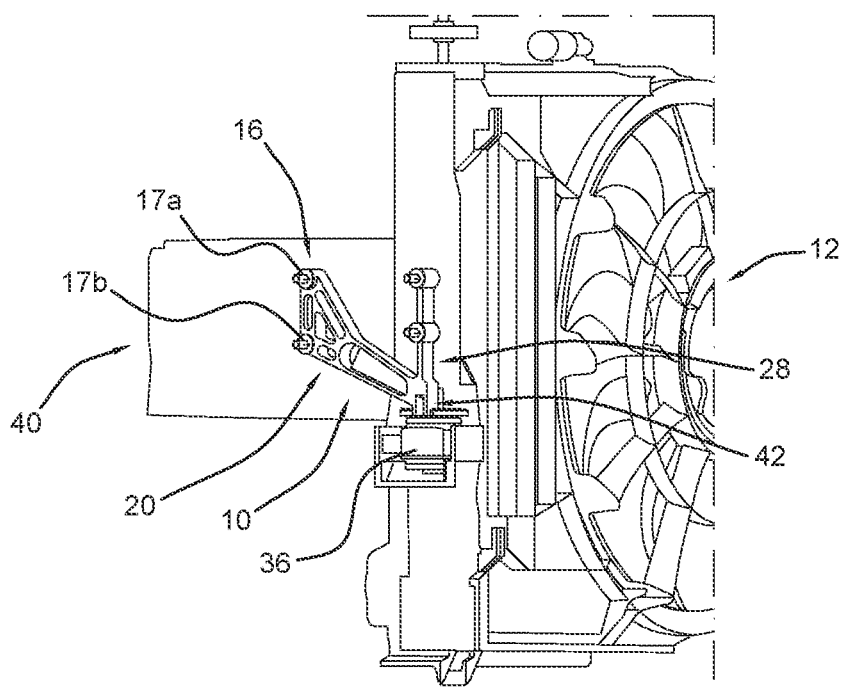
FIG. 1B is a side view of the cooling bracket and front vehicle parts, with the crash-box transparent for viewing purposes.
Figure 1C:
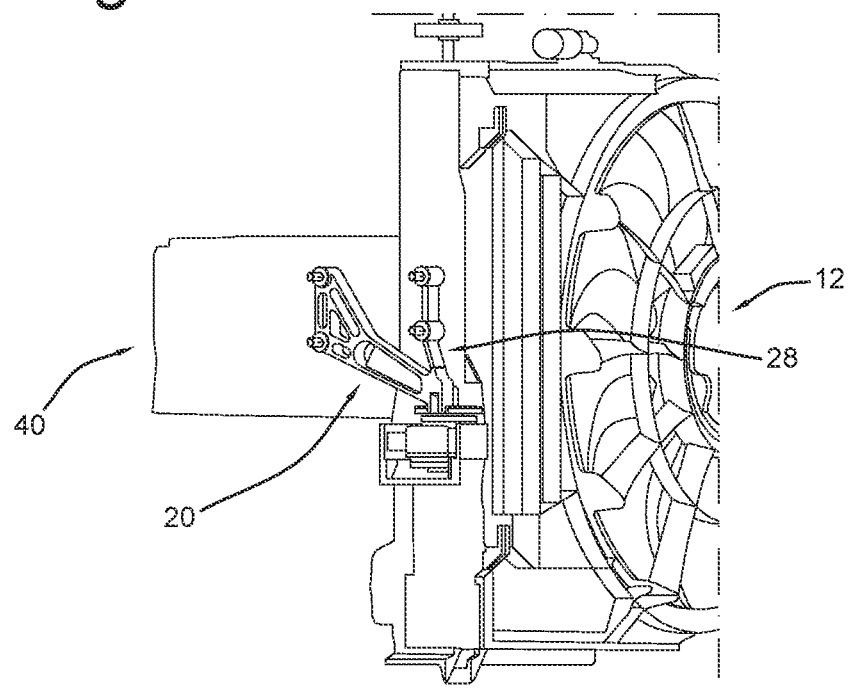
FIG. 1C is a side view of the cooling bracket and front vehicle parts at the start of a front impact crash.
Figure 1D:
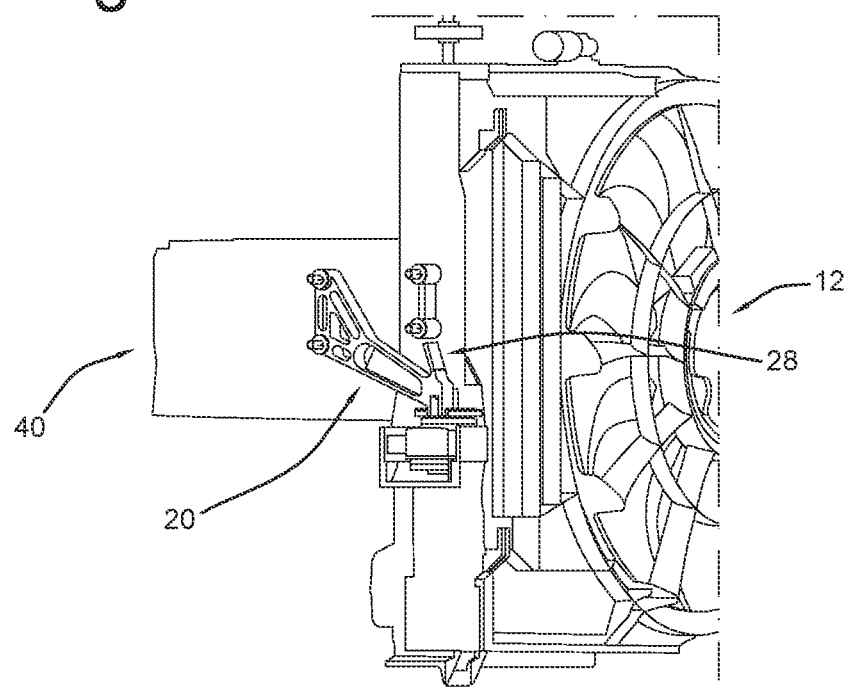
FIG. 1D is a side view of the cooling bracket and front vehicle parts after the front impact crash.

FIG. 1A is a rear perspective view of a cooling module bracket 10 connecting a cooling module 12 to a side crash-box 14, FIG. 1B is a side view of the bracket 10 and front vehicle structure, with the crash-box transparent for viewing purposes, FIG. 1C is a side view of the bracket 10 and front vehicle structure at the start of a front impact crash, and FIG. 1D is a side view of the bracket 10 and front vehicle structure after the front impact crash.

Cooling module 12 includes fan 32, radiator 34 and cooling bushings 36. Cooling module 12 typically extends along the width of the front end of the vehicle between crash-boxes 14 on a first side and a second side (not shown), with a bumper 40 or other front structure (see FIG. 1D) extending in front of the cooling module 12.

Each side of cooling module 12 connects to a side crash-box 14 via bracket 10. While only one side of the vehicle frontal structure is shown in FIGS. 1A-1D, the other side connection of the cooling module 12 to side crash-box 14 would be a mirror image of the one shown, also connecting by a bracket 10. Brackets 10 would be mirror images of each other on each of the first and second sides, with protrusion 30 ensuring that bracket 10 is connected on the correct side. Protrusion 30 would extend outward, not allowing rear crash-box connection means 26 to bolt into crash-box 14 if someone attempted to use the bracket shown in FIG. 1A on the opposite side of the cooling module 12. While protrusion 30 is shown as the feature to ensure proper side connection, other embodiments could vary the size, shape, etc. so long as the features function to ensure that the specific bracket 10 only connects on the intended side.

Bracket 10 includes forward crash-box connection means 16, cooling module connection means 18, rigid arm 20 with frontal side 22 and rearward side 24, rear crash-box connection means 26, break-away arm 28, and protrusion 30. Forward crash-box connection means 16 is shown as two bores in bracket 10 for receiving two bolts 17a, 17b spaced vertically from each other along the frontal side of the rigid arm 20 and connecting to the crash-box 14. Rear crash-box connection means 26 are also shown as two vertically spaced bores in bracket 10 for receiving bolts connecting to the crash-box 14 at a rearward position from the connection location of forward crash-box connection means 16. While two bores and bolts are shown, there can be more or fewer connectors, different types of connectors and/or could be arranged differently for connecting the bracket to the crash-box at the forward connection means and/or the rearward connection means.

In use, brackets 10 connect cooling module 12 to the crash-box on a first side and second side of the vehicle (right side and left side when looking at the vehicle from a front). A screw 42 extends in a vertical direction through a bore in bracket 10 (which could be threaded), connecting a rearward side 24 of rigid arm 20 with a cooling bushing 36 at the side of the cooling module 12. The cooling bushing 36 can be integrally formed with parts of the cooling module 12, or can be formed separately and securely connected at a side. The other connection means 16, 26 of bracket 10 connect to the crash-box 14. Thus, in normal operations, brackets 10 (one on each side) secure cooling module 12 within the vehicle.

In the case of a low-speed front end collision, the front of the vehicle is typically damaged and the bumper 40, and other front parts of the vehicle are moved rearward from the frontal impact force. In past systems, this typically pushed the front end of the vehicle into the cooling module 12, often damaging the cooling module 12, even in low speed collisions. A damaged cooling module 12 is often expensive to repair, and the vehicle is usually not driveable until the repair has been done.

Brackets 10, with rigid forwardly-extending arm 20 and break-away arm 28, help to promote distance being maintained between the front end of the vehicle and the cooling module 12 in a low-speed frontal impact crash by moving the cooling module 12 rearward with any movement of the front end of the vehicle. Brackets 10 extend forward of the cooling module 12 for their forward crash-box connection means 16 to connect to the crash-box 14 on either side of the cooling module 12. This can be about 120-125 mm forward from the connection point, though can vary in different applications, for example, 90 mm-160 mm. The extension forward makes it possible to sense the forward collision at an early moment.

As shown in FIG. 1C, upon initiation of a low-speed frontal impact, the front portion of the vehicle, including the portion to which forward crash-box connection means 16 connects, moves rearward. Rigid arm 20 then translates this to move the entire cooling module 12 rearward through cooling module connection means 18. Break-away arm 28 breaks upon the impact force, allowing for the rearward movement of the rigid arm 20 and cooling module 12 in the case of a crash. FIG. 1C shows the point where break-away arm 28 starts to separate, and FIG. 1D shows the parts of bracket 10 and vehicle front end after the crash and resulting movement.

Thus, the use of side brackets 10 to connect cooling module to crash-boxes 14 is a simple way to reduce or eliminate damage to the cooling module 12 from a low speed frontal impact collision. By reducing or preventing damage to the cooling module 12, the overall resulting damage is less and the vehicle is therefore less expensive to repair. Additionally, if the cooling module 12 is not damaged in such a collision, the driver can often drive the vehicle to a repair shop themselves, resulting in time and cost savings by avoiding the need for a tow-truck. Moreover, such a bracket 10 can result in economic savings in car insurance by reducing the likelihood of costly repairs after low-speed frontal impact collisions.

Figure 2A:
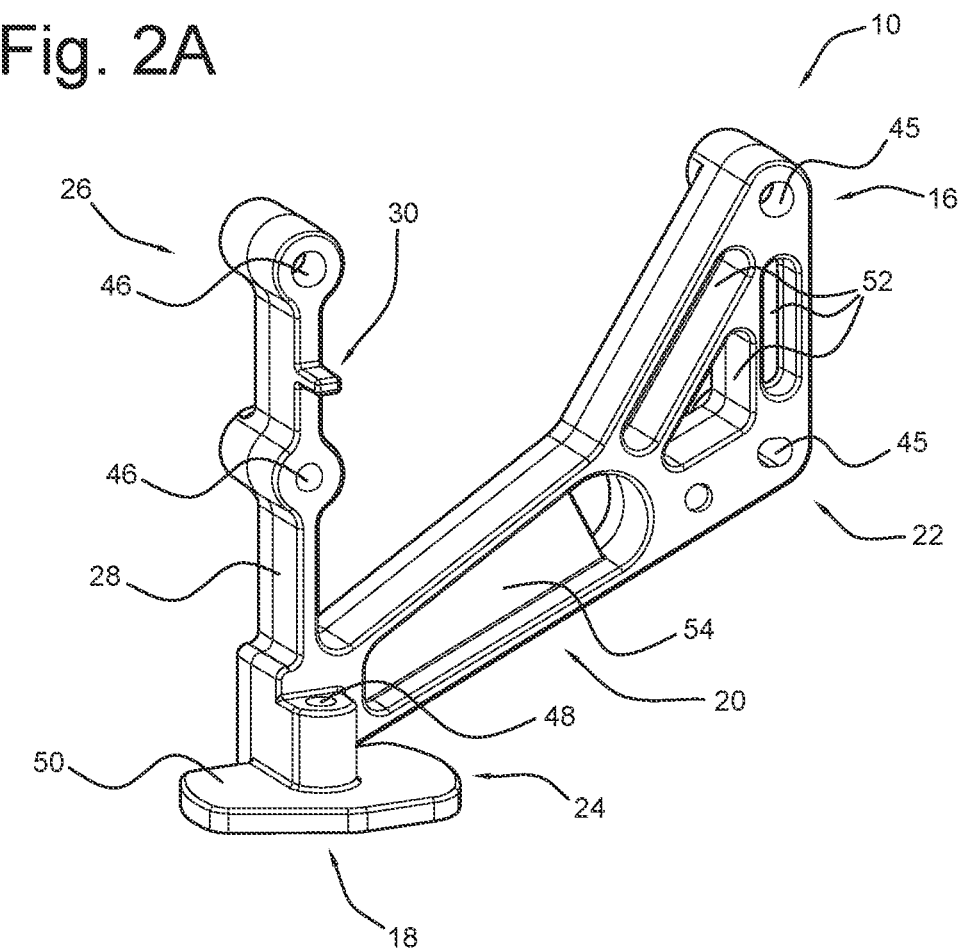
FIG. 2A is a perspective view of an inner side of the bracket of FIGS. 1A-1C.
Figure 2B:
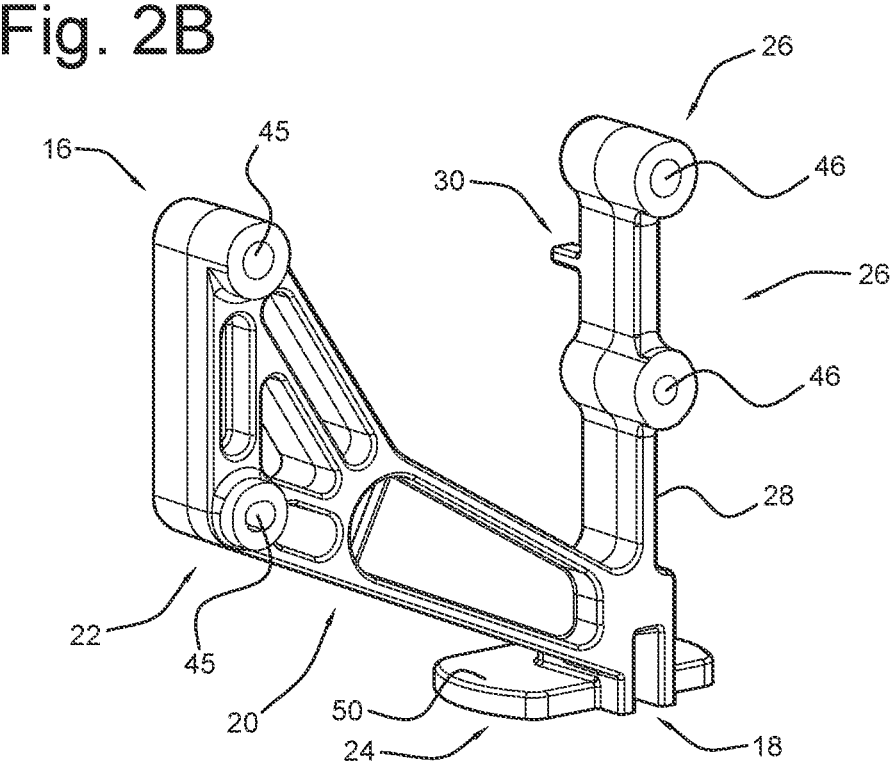
FIG. 2B is a perspective view of an outer side of the bracket of FIG. 2A.
Figure 2C:
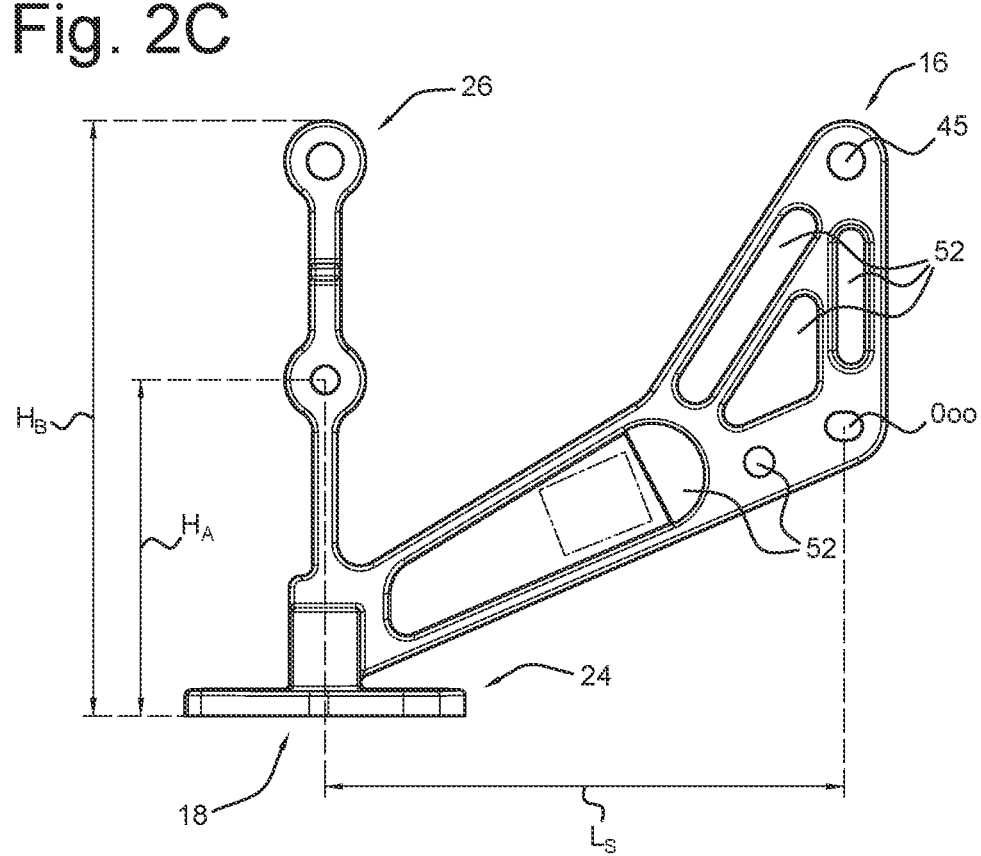
FIG. 2C is a side view of the bracket of FIG. 2A.
Figure 2D:
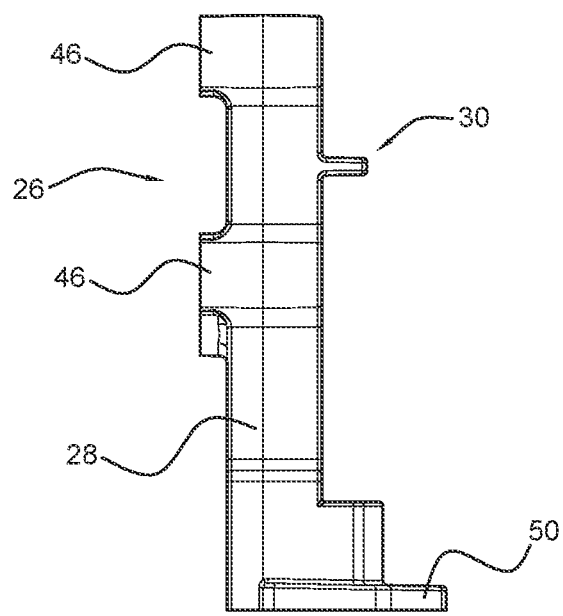
FIG. 2D is a rear view of the bracket of FIG. 2A.

FIG. 2A is a perspective view of a first (inner) side of bracket 10, FIG. 2B is a perspective view of a second (outer) side of the bracket 10, FIG. 2C is a side view of bracket 10, and FIG. 2D is a rear view of bracket 10. Bracket 10 includes forward crash-box connection means 16, cooling module connection means 18, rigid arm 20 with frontal side 22 and rearward side 24, rear crash-box connection means 26, break-away arm 28, and protrusion 30. Bracket 10 shown in FIGS. 2A-2D is a right side bracket (when viewing the vehicle from a front), and the left side bracket would be a mirror image from the side (FIG. 2C).

Forward crash-box connection means 16 include two vertically spaced bores 45, each for receiving a connector such as a bolt or screw. The bores 45 could include interior threads. Rear crash-box connection means 26 also includes two vertically spaced bores 46, each for receiving a connector such as a bolt or screw, and could be similarly threaded. The vertically spaced bores 45 can be in a portion of rigid arm 20 which has a tapered shape. The tapered shape can be from the front side 22 to the rearward side 24, and in some embodiments, such as the one shown in FIGS. 2A-2D, have two separate tapers, a first larger taper at the front side 22, and a second taper where that ends to the rear side 24. As described and shown, these can have cut-out portions as needed for either accommodating other pass-through parts or for simply saving materials when additional strength is not required.

Break-away arm 28 connects rear crash-box connection means 26 with rearward side 24 of rigid arm 20. Break-away arm 28 is much thinner (in a side view, see FIG. 2C) than rigid arm 20, and is dimensioned such that break-away arm 28 will break in one or more places upon a frontal impact collision, disconnecting bracket 10 and cooling module 12 from rear crash-box connection means 26.

Cooling module connection means is a vertically extending cavity 48, which could include threads for receiving a connector such as a bolt or screw to connect to the cooling module bushing 36. In the bracket 10 shown, a collar 50 surrounds cavity 48 for connecting securely to cooling module and preventing upward movement of the cooling module.

Rigid arm 20 extends from a rearward side 24 forward and upwards to a frontal end 22. As can be seen in FIGS. 2A-2C, rigid arm expands in height from the rearward side 24 to the forward side 22 as well, as can be seen clearly in FIG. 2C. In this embodiment, the lower side of rigid arm 20 extends generally straight or planar in a forwards and upwards direction, with the top side having a first section extending upward at an angle, and a second section extending upward at a steeper angle toward the frontal end 22. This angle is typically less than 90 degrees. Corners and sides are generally rounded. Additionally, rigid arm 20 includes a number of cut-out sections 52, which can reduce the weight and materials needed, as well as could provide through-paths for cables within the vehicle. There can be other parts 54 which are made generally less thick for further reducing material while maintaining strength and stability requirements for rigid arm 20 to not break upon a low-speed frontal impact collision, and move cooling module back 12 with any movement of the front end of the vehicle.

FIG. 2C shows sample dimensions for bracket 10, though these could vary in different embodiments. Side length $L_S$ between the rear crash-box connection means 26 (and cooling module connection means 18) to forward crash-box connection means 16 is about 115 mm, the height of bracket 10 $H_B$ from the bottom of bracket 10 at crash-box connection means 26 to the top of both the rear crash-box connection means 16 and the forward crash-box connection means 16 is about 132 mm, with the height of break-away arm 28 $H_A$ (from the bottom of bracket 10 at crash-box connection means 26 to the first connector opening 46 of rear crash-box connection means) being about 74.5 mm.

Bracket 10 can be formed by a metal material, for example aluminium (including alloys), and could be formed by die casting and/or other means.

In summary, bracket 10 provides a simple, yet strong and durable side connection for the cooling module 12 in normal operation, and allows for rearward movement of the cooling module in a low-speed frontal impact crash to reduce or eliminate damage to the cooling module in such a collision. The break-away arm 28 is strong enough to handle the durability loads in normal operation (e.g., 15 g in the Z-direction and 5 g in the X and Y directions), but thin enough to break very quickly (e.g., within 45 miliseconds) upon a frontal impact crash to decouple the cooling module 12 from the body structure. This decoupling allows for rearward movement of the rigid arm 20 of bracket 10 and therefore cooling module 12 through the bracket connection means 18 to bushing 30. Rigid arm 20 is designed to meet high speed crash requirements and minimize materials and weight while ensuring sufficient strength to push the cooling module 12 back as much as possible upon impact. The rearward movement of cooling module then helps to protect the expensive cooling module 12 as much as possible from damage after a front end impact, only needing the less expensive crash-boxes 14 and/or brackets 10 needing repairing and/or replacement after such an impact. Additionally, when the cooling module is not damaged, the vehicle can still generally be driven to a repair shop instead of requiring a tow. Bracket 10 also meets the requirements for normal operation and for high speed impacts, minimizing or eliminating the possibility of parts unintentionally fully detaching in such a high speed impact crash and damaging other parts of the vehicle.

Bracket 10 additionally can be used in many different vehicles, making fewer design variations needed, and thereby simplifying manufacturing and assembly. The ability to use in many different vehicles due to the design also helps to lower overall costs.

While bracket 10 with connections means 16, 18, 26 are shown with specific design and details in the drawings, such designs could vary. For example, the connection means could differ, the bracket rigid arm 20 could have a different configuration and/or the break-away arm 28 could be placed slightly differently, as long as the bracket 10 design ensures that front connection means are located in front of the cooling module 12, and that in the event of a frontal impact crash, that break-away arm 28 will separate to allow rigid arm to move cooling module rearward. The relative dimensions, sizing, and exact configuration of components could vary.

While the bracket is shown and described as connecting directly to the crash-box and the cooling module, some embodiments would not have a direct connection and there could be one or more parts between in the same chain. For example, one or more bushings could be between the bracket and crash-box and/or the bracket could be connected to an external cooling module carrier.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular or preferred embodiments disclosed, but that the disclosure will include all embodiments falling within the scope of the appended claims.

What is claimed is:

1. A bracket for a cooling module in a front end structure of a vehicle, the bracket comprising:
   forward crash-box connection means for directly connecting the bracket to a crash-box at a forward position;
   cooling module connection means;
   a rigid arm extending between the forward crash-box connection means at a forward side and the cooling module connection means at a rearward side;
   rear crash-box connection means; and
   a break-away arm extending from the rearward side of the rigid arm and the rear crash-box connection means.

2. The bracket of claim 1, wherein the forward crash-box connection means comprises a plurality of connectors.

3. The bracket of claim 2, wherein the plurality of connectors comprises two vertically spaced connectors.

4. The bracket of claim 1, wherein the cooling module connection means comprises a screw connection to a cooler side bushing.

5. The bracket of claim 1, wherein the rear crash-box connection means comprises a plurality of connectors.

6. The bracket of claim 5, wherein the plurality of connectors comprises two vertically spaced connectors.

7. The bracket of claim 1, wherein the break-away arm extends substantially vertically from the cooling module connection means.

8. The bracket of claim 1, wherein the rigid arm forms an angle of less than 90 degrees with the break-away arm.

9. The bracket of claim 1, wherein the rigid arm comprises an arm which expands in height from the rearward side to the forward side.

10. The bracket of claim 1, wherein the rigid arm comprises cut-out sections and/or sections of reduced material.

11. The bracket of claim 1, and further comprising a protrusion on one side of the bracket.

12. The bracket of claim 1, wherein the bracket is formed of metal.

13. The bracket of claim 1, wherein the rigid arm and the break-away arm extend in substantially a same plane.

14. A cooling module with a first bracket connected to a first cooling module bushing on a first side of the cooling module, and a second bracket connected to a second cooling module bushing on a second side of the cooling module; wherein each of the first and second brackets comprises:
   forward crash-box connection means for directly connecting the bracket to a crash-box at a forward position,
   cooling module connection means,
   a rigid arm extending between the forward crash-box connection means at a forward side and the cooling module connection means at a rearward side,
   rear crash-box connection means, and
   a break-away arm extending from the rearward side of the rigid arm and the rear crash-box connection means; and
   wherein for each of the first and second brackets, the cooling module connection means connects to the cooling module bushing with a screw or bolt connection.

15. A frontal vehicle structure comprising the cooling module and first and second brackets according to claim 14, and further comprising a first crash-box on the first side and a second crash-box on the second side; wherein for each of the first and second brackets, the forward crash-box connection means and the rearward crash-box connection means connects to forward and rearward positions of the crash-box, respectively.

16. The frontal vehicle structure of claim 15, wherein each of the first and second brackets are dimensioned such that the break-away arms break in one or more pieces at a frontal impact crash, and the rigid arms maintain their rigidity to move the cooling module rearward upon rearward movement of the crash-box and forward crash-box connection means.

17. A method of protecting a cooling module in a frontal impact crash using first and second side brackets, each bracket comprising forward crash-box connection means for directly connecting the bracket to a crash-box at a forward position, cooling module connection means; a rigid arm extending between the cooling module connection means at a rearward side and forward crash-box connection means at a forward side, rear crash-box connection means, and a break-away arm extending from the rearward side of the rigid arm to the rear crash-box connection means, the method comprising:
   a) connecting the cooling module connection means of the first bracket to a first side bushing of the cooling module;
   b) connecting the forward crash-box connection means of the first bracket to a first side crash-box;

c) connecting the rear crash-box connection means of the first bracket to the first side crash-box at a rearward position from the forward crash-box connection means;
d) connecting the cooling module connection means of the second bracket to a second side bushing of the cooling module;
e) connecting the forward crash-box connection means of the second bracket to a second side crash-box; and
f) connecting the rear crash-box connection means of the second bracket to the second side crash-box at a rearward position from the forward crash-box connection means.

18. The method of claim 17, wherein the connections are with one or more bolts or screws.

* * * * *